United States Patent [19]

Masson et al.

[11] Patent Number: 5,007,078

[45] Date of Patent: Apr. 9, 1991

[54] AUTOMATED ORDER ENTRY RECORDING METHOD AND APPARATUS

[75] Inventors: Ronald K. Masson, Topanga; Michael W. Edelson, Simi Valley, both of Calif.

[73] Assignee: American Communications & Engineering, Inc., Simi Valley, Calif.

[21] Appl. No.: 344,666

[22] Filed: Apr. 28, 1989

[51] Int. Cl.$^5$ ............................................. H04M 1/65
[52] U.S. Cl. ......................................... 379/75; 379/70
[58] Field of Search ...................... 379/88, 70, 80, 89, 379/75; 360/137

[56] References Cited

U.S. PATENT DOCUMENTS

| | | | |
|---|---|---|---|
| 4,359,607 | 11/1982 | Hannig et al. | 379/70 X |
| 4,553,182 | 11/1985 | Narita | 360/137 X |
| 4,588,857 | 5/1986 | Arsem | 379/80 X |
| 4,782,510 | 11/1988 | Szlam | 379/88 |

Primary Examiner—Stuart S. Levy
Assistant Examiner—James E. Tomassini
Attorney, Agent, or Firm—Blakely, Sokoloff, Taylor & Zafman

[57] ABSTRACT

A system and method for recording voice messages received in an automated message exchange system. Voice messages are digitized by the message exchange system at the time they are received. At a convenient time determined by the computer of the message system, such digitized voice messages are converted back to a verbal audio signal for recording on a conventional cassette tape recorder. Other digital information stored in the message exchange system may also be verbalized for recording on the tape recorder in association with the corresponding voice message. An interface unit starts the cassette tape recorder when the message exchange system is ready to begin taping a message, conveys a signal to the message exchange system confirming that the tape recorder is operating properly, and then conveys the verbal audio signal to be recorded from the message exchange system to the cassette tape recorder. In addition, the interface unit has alarm circuitry to provide both a visual and audible indication to an attendant if the tape cassette is full or if the tape recorder has malfunctioned. Verbal messages recorded on the cassette are then transcribed into text or a machine-readable format off-line from the message exchange system.

8 Claims, 3 Drawing Sheets

AUTOMATED ORDER ENTRY RECORDING METHOD AND APPARATUS

BACKGROUND OF THE INVENTION

1. Field of the Invention

The present invention relates to the field of information and business systems and, in particular, to automated systems for exchanging information via telephone equipment.

2. Background Art

In recent years various technologies have been developed to ease various aspects of communications and business activities. In general, these developments have related to the reducing of costs, and/or the at least partial automating of functions previously done manually to increase the speed and accuracy with which these functions may be accomplished. Described hereinafter are certain of these developments relating to and forming prior art relevant to the present invention.

In the commonly owned co-pending application Ser. No. 07/142,676, the disclosure of which is incorporated herein by reference, a prior art Interactive Voice Exchange Computer (IVEC) for receiving and playing messages over telephone lines is described. The IVEC system uses a digital computer and enhanced digital speech technology to record and play back natural speech and music with a clarity approaching that of the original sound. A single such system can deliver multiple messages to multiple telephone lines for multiple information providers, independently and simultaneously. It can, for example, answer up to 52 lines on the first ring, respond to one or more touch tone digits dialed by callers, then select and play a sequence of one or more common or unique messages in a pattern depending upon what was dialed. Up to eight completely independent information services can coexist on the same system, with each of the eight playing a simple message or a different complex pattern of messages with any combination of common or unique parts, such as introductions, spots, transitions, tags, and optional fill-ins. If desired, individual spoken words may even be selected automatically or by a data link to create detailed time, weather and quote services.

All of the messages on the IVEC system may be recorded on site or remotely from any touch tone telephone while the system stays on line answering calls. Different passwords protect up to eight providers from unauthorized updating. The system also keeps separate comprehensive accounting data for each provider, including a grand total, a resettable total, individual line totals, hourly totals and caller choice totals. All of the totals may be obtained on site or remotely in spoken words and numbers from any touch tone telephone. As with updating, different passwords protect each provider from unauthorized access. The system, when fully configured, consists of a personal computer, such as an IBM AT with the PC DOS operating system, appropriate software, keyboard, CRT display, power line conditioner, one or more four-line telephone interface circuit boards and one or more four-line conferencing boards installed either in the computer cabinet itself or in an expansion cabinet.

In the aforementioned co-pending application, an information network and method for providing a nationwide audio text network, including electronic billing, useful for a wide variety of applications is disclosed. The information network utilizes a telephone message delivery system coupled to phone lines, typically the "800" area code common carrier lines, to receive incoming calls and to interactively respond thereto. One or more message delivery systems may be connected to a data base computer which, among other tasks, maintains a credit card data base and communicates telephonically with the appropriate credit car service bureaus to obtain credit verification and record charges to customer accounts. Such communications with a service bureau is preferably performed concurrently with processing of an incoming call so that the message delivery system can respond to a caller in accordance with information received from the service bureau. For example, if the tendered credit card number is invalid, the call may be promptly terminated.

As disclosed in the co-pending application, the message exchange system may be used for a variety of applications ranging from simple information dissemination to automatic order entry with credit verification and/or charges. It may be configured as a fully automated system without live operator intervention or with as much operator intervention as desired or required for assisting in special circumstances. In the system previously disclosed, intervention of a live operator is required for taking information such as names or addresses not readily remotely enterable from a touch tone keyboard.

Also known in the prior art are various message recording devices which use magnetic recording media for recording voice messages spoken over a telephone line. The most common of these are so-called "answering machines" that automatically connect to an incoming telephone call, play a pre-recorded greeting message and then record a spoken message from the calling party.

One of the objects of the present invention is to provide an automated message exchange system wherein a caller may provide certain information in touch tone coded format and certain other information verbally without requiring the intervention of a live operator at the time the call is received.

It is a further object of the present invention to provide a system for transcribing verbal information provided by a caller into a text or machine-readable format off-line from the message exchange system.

It is yet a further object of the present invention to automatically create verbal records of recorded voice and/or touch tone coded data in a convenient, standard audio recording medium for subsequent transaction processing off-line from the message exchange system.

SUMMARY OF THE INVENTION

A system and method for recording voice messages received in an automated message exchange system is disclosed. Voice messages are digitized by the message exchange system at the time they are received. At a convenient time determined by the computer of the message system, such digitized voice messages are converted back to a verbal audio signal for recording on a conventional cassette tape recorder. Machine-readable information, such as may be provided by a caller using touch tone codes, is "spoken" by the message system and recorded together with the reconstruction of the voice messages associated with the same transaction so that the tape cassette will contain a complete verbal record of each transaction. Multiple transactions may be recorded sequentially on the tape cassette.

An interface unit is provided to start the cassette tape recorder when the message exchange system is ready to begin taping a message, to convey a signal to the message exchange system confirming that the tape recorder is operating properly, and to convey the reconstructed audio signal to be recorded from the message exchange system to the cassette tape recorder. In addition, the interface unit has alarm circuitry to provide both a visual and audible indication to an attendant if the tape cassette is full or if the tape recorder has malfunctioned. Information recorded on the tape cassette is then transcribed off-line from the message exchange system.

Alternatively, only the voice messages provided by a caller may be recorded on tape and such messages may then be transcribed into a machine-readable format. The transcribed information may then be entered into a general purpose computer where it may be correlated with machine-readable information that was stored in the message exchange system at the time the call was received and subsequently transferred to the general purpose computer.

DETAILED DESCRIPTION OF THE PREFERRED EMBODIMENT

A method and apparatus for recording and processing information provided by a caller to an automated order entry or similar system are disclosed. In the following description, for purposes of explanation and not limitation, specific numbers, electrical components, etc. are set forth in order to provide a thorough understanding of the present invention. However, it will be apparent to one skilled in the art that the present invention may be practiced without these specific details. In other instances, well known electronic circuits and components that are employed in the described embodiment are not described in detail so as not to obscure the disclosure of the present invention.

Figure 1:
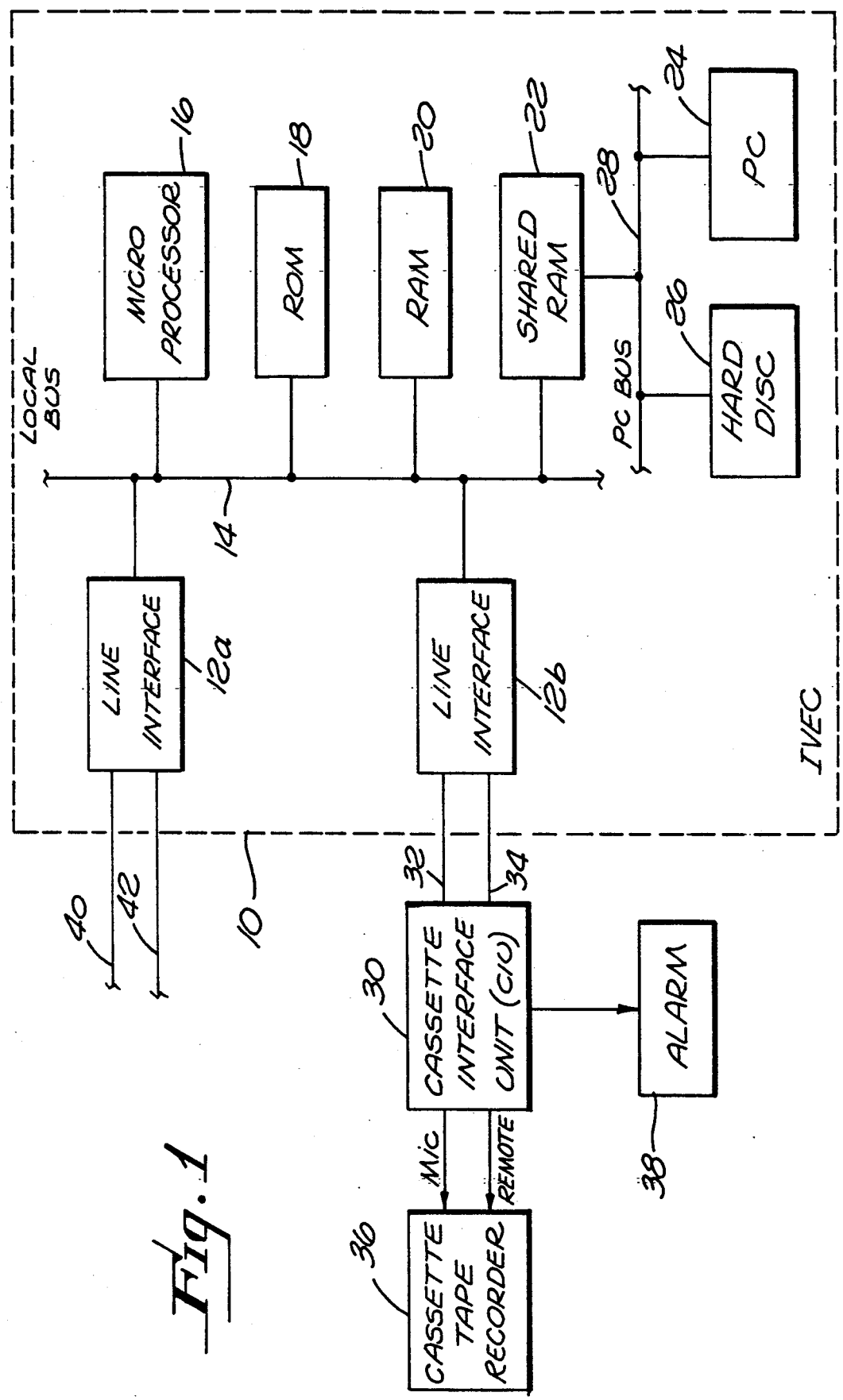
FIG. 1 is a functional block diagram illustrating use of the present invention with an Interactive Voice Exchange Computer.

Referring first to FIG. 1, a functional block diagram is presented showing the present invention as it is used in connection with an Interactive Voice Exchange Computer (IVEC) of the type described in the aforementioned co-pending application Ser. No. 07/142,676. Following is a brief description of the structure and function of the IVEC, as it pertains to the present invention. Further details of the IVEC system may be had with reference to the above-mentioned co-pending application.

The IVEC, shown within the phantom enclosure 10, comprises a plurality of line interface units 12. Each line interface unit 12 is coupleable to the tip and ring lines of a standard telephone line. Each line interface unit comprises circuitry for detecting telephone line loop current, touch tone detection and generation circuitry, and analog to digital conversion circuitry. The interface unit provides sensing of the open telephone line to detect ring signals through an internal ring detect circuit. In response to detection of a ring signal and under the control of PC 24, the interface unit seizes a telephone line by putting the conventional line load thereon, and then detects the telephone line loop current or the absence thereof.

Also included within the line interface unit 12 is a touch tone control circuit which, through appropriate control of microprocessor 16, can dial an outgoing call or, alternatively, can detect touch tone codes entered through the touch tone keypad of a caller's telephone, once the line connection has been established. This capability is essential to the operation of the IVEC as an order entry system, since it is the ability of the IVEC system to receive numeric information and simple alpha information (Y for yes, N for no, etc.) in touch tone coded format that allows the system to automatically communicate with a caller for receipt of order entry and similar information.

The line interface units 12 are coupled to a local bus 14 to which microprocessor 16 is also coupled. ROM 18 for permanent storage of the microprocessor operating program, RAM 20 for temporary storage of data to support the operating program of the microprocessor, and shared RAM 22 are also coupled to bus 14. A personal computer (PC) 24 and its associated hard disk 26 are included within the IVEC system. Shared RAM 22 is coupled to PC bus 28 as well as local bus 14, thereby making shared RAM 22 accessible to PC 24 to facilitate data flow between microprocessor 16 and PC 24.

Cassette interface unit (CIU) 30 is coupled to line interface unit 12b by lines 32 and 34 which correspond to the tip and ring lines of a conventional telephone line. As will be more fully described below, CIU 30 detects closure of a circuit through lines 32 and 34 by line interface unit 12b and controls the operation of tape recorder 36. Briefly stated, the functions of CIU 30 are to start tape recorder 36 when IVEC 10 is ready to tape a message, to convey a signal to the IVEC confirming proper operation of tape recorder 36, and to convey to the tape recorder the audio signal to be recorded that is provided by the IVEC.

Tape recorder 36 is preferably a conventional cassette tape recorder having a microphone (MIC) input and a remote input for selectively enabling the tape transport mechanism of the recorder when the recorder is placed in the recording mode. Although the present invention is described in connection with a conventional cassette tape recorder it will be recognized that other recording devices capable of recording an analog voice signal may also be used.

In operation, an incoming call is routed via telephone lines 40 and 42 to line interface unit 12a. The call is processed by IVEC 10 as described in the aforementioned co-pending application. As will be described below, the caller may provide certain information in touch tone coded format and other information verbally. Verbal information, which will be recorded as an analog voice signal on tape recorder 36, is digitized in line interface 12a and then temporarily stored in shared RAM 22. The digitized message is then transferred to hard disk 26 under control of PC 24.

At a convenient time determined by the IVEC system operating program executed in PC 24, IVEC 10 establishes a connection with CIU 30 through line interface 12b. The digitized voice information previously received from the caller is then converted back into an analog signal by line interface 12b and, as more fully explained below, is provided on the MIC input of cassette tape recorder 36. At the time line interface 12b establishes a connection with CIU 30, the tape transport mechanism is started in recorder 36. CIU 30 senses motion of the tape before "answering" the line request from IVEC 10. If motion of the tape is not detected, such as may occur if the tape cassette is full or if recorder 36 malfunctions, an alarm 38 is enabled to alert an attendant to replace the tape cassette or to service the recorder as required.

Figure 2:
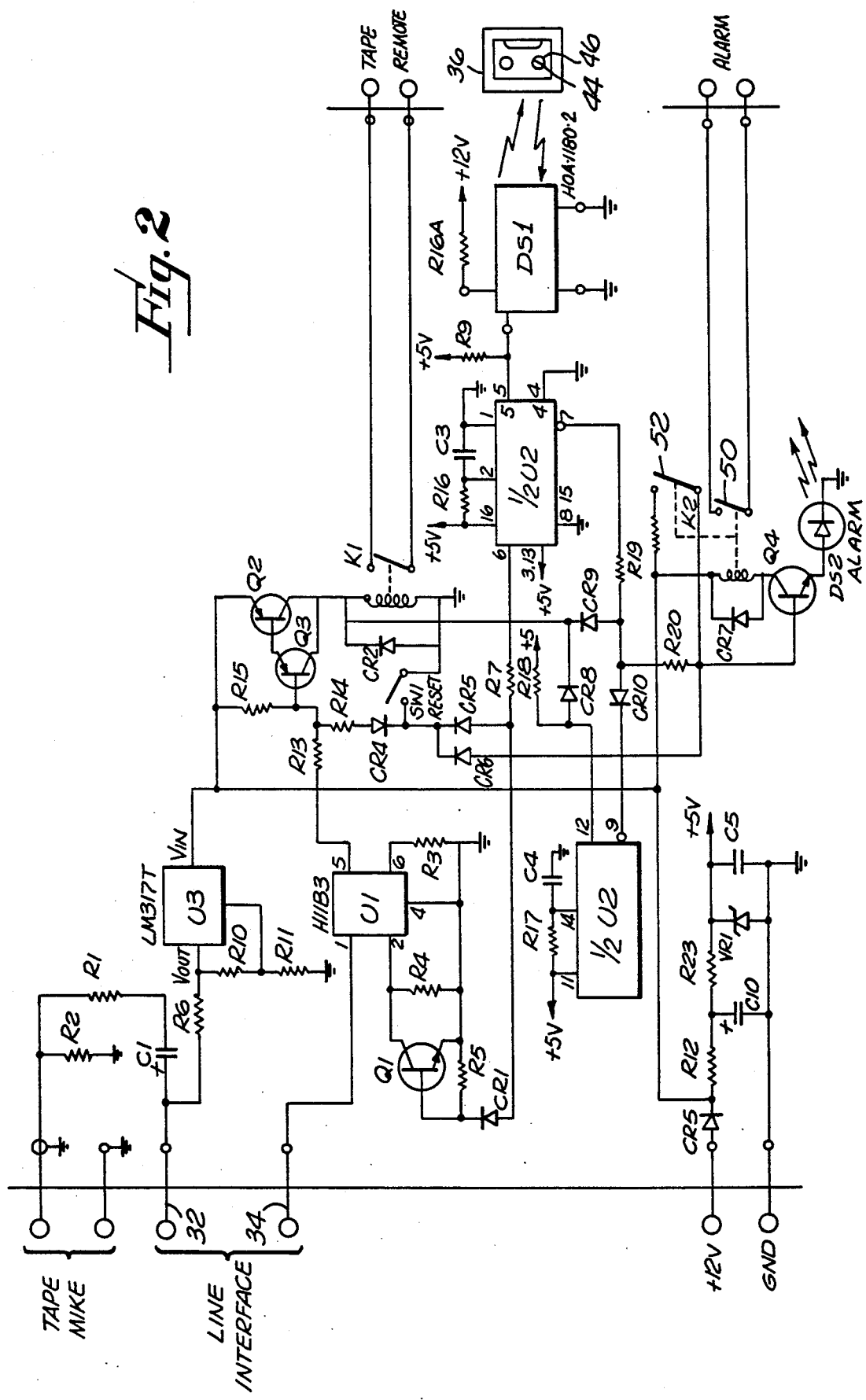
FIG. 2 is an electrical schematic diagram of a circuit for a Cassette Interface Unit according to the present invention.

Referring now to FIG. 2, the detailed construction and operation of CIU 30 will be described. As previously discussed, the CIU communicates with IVEC 10 via tip and ring lines 32 and 34. When the IVEC requests operation of a tape recorder to record a voice message, a line relay within the appropriate line interface unit of the IVEC is closed, thereby completing a circuit between lines 32 and 34. Line 32 is coupled to resistor R6 which is also coupled to the $V_{OUT}$ pin of 9 volt regulator U3 which receives +12 VDC at pin $V_{IN}$ across diode CR5. Line 34 is coupled to pin 1 of optocoupler U1, with pin 2 of opto-coupler U1 being coupled to resistor R4 and to the collector of transistor Q1, pins 1 and 2 being the LED leads of the optocoupler. The opposite end of resistor R4 and the emitter of transistor Q1 are coupled to ground.

When the circuit between lines 32 and 34 is completed by IVEC 10, a low level current of approximately 1 ma flows from regulator U3 through IVEC 10, through the LED section of optocoupler U1 and through resistor R4 to ground. Such a low level of current is insufficient for IVEC 10 to recognize the presence of a line current.

Pins 5 and 6 of opto-coupler U1 are connected to the detector section thereof. Pin 5 is coupled to one end of resistor R13, whose other end is coupled to the base of transistor Q3. The emitter of transistor Q3 is connected, in cascade fashion, to the base of transistor Q2. A 1 ma current flowing through lines 32 and 34 is sufficient to adequately illuminate the LED of opto-coupler U1. This, in turn, causes current to flow through pins 5 and 6 of opto-coupler U1, thereby switching on transistors Q2 and Q3. The emitter of transistor Q2 is coupled to +12 VDC, and the collector is coupled to one end of the coil of relay K1. When transistor Q2 switches on, the coil of relay K1 is energized, thereby closing a circuit through the remote input of the cassette tape recorder. By pre-setting tape recorder 36 in the record mode, actuation of relay K1 will cause the tape transport mechanism to operate and recording to begin.

Since the present invention is directed to an automated system which is not dependent upon the presence of a human operator or attendant, it is necessary to verify the proper operation of the tape recorder prior to providing the audio information to be recorded. In the preferred embodiment of the present invention, a reflective tab 44 is applied to one of the spindles 46 of tape recorder 36. Sensor DS1, a device comprising an infrared LED and a photo-transistor in the same package, is physically located in proximity to the reflective tab 44. Both the LED and photo-transistor of sensor DS1 are aimed so that an object passing in close proximity will reflect energy emitted by the LED to the photo-transistor which produces an output signal in response thereto. As the spindle 46 of tape recorder 36 rotates, sensor DS1 provides a cyclical output which is coupled to pin 5 of dual retriggerable one-shot multivibrator U2. The pulse width of the output at pin 6 of U2 is set to be longer than the rotational period of the tape recorder spindle by appropriate selection of the circuit values for resistor R16 and capacitor C3, in the preferred embodiment, approximately 3 seconds. Since U2 is a retriggerable multivibrator, the output at pin 6 will remain at a logic one, i.e. at approximately +5 VDC, continually for as long as the spindle 46 of tape recorder 36 is rotating.

Pin 6 of multivibrator U2 is coupled to the base of transistor Q1 through diode CR1. When pin 6 of U2 is at a logic one, i.e. when tape recorder 36 is running, transistor Q1 is switched on. As mentioned previously, the collector and emitter of transistor Q1 are coupled across resistor R4. Thus, when transistor Q1 is switched on, resistor R4 is effectively shorted out causing a higher level of current to flow through lines 32 and 34. In the embodiment illustrated in FIG. 2, such higher level of current is approximately 30 ma. This higher line current is sufficient to be detected by IVEC 10, and the IVEC software is thereby informed that tape recorder 36 is operating properly. IVEC 10 then begins to regenerate an audio signal from the digitized verbal information previously stored for recording by recorder 36. The resultant audio signal is conveyed on line 32 to capacitor C1. Resistors R1 and R2 comprise a voltage divider network to reduce the amplitude of the signal applied to capacitor C1 to an amplitude compatible with the microphone input of recorder 36.

Pin 7 of multivibrator U2 is an inverted output, i.e. having a logic sense opposite that of output pin 6. As long as spindle 46 of tape recorder 36 is rotating and pin 6 is at a logical one, output pin 7 of U2 remains low and does not provide base current to transistor Q4. With transistor Q4 switched off, the coil of relay K2 is de-energized and LED DS2 remains off.

In the event that spindle 46 should stop rotating, output pin 7 of U2 will remain low only for the one-shot pulse width, i.e. approximately three seconds. Pin 7 will then switch to a logical one (i.e. +5 VDC), thereby supplying base current to transistor Q4 through resistors R19 and R20. Transistor Q4 thus switches on, energizing the coil of relay K2 and causing LED DS2 to illuminate. When the coil of relay K2 is energized, relay contact 50 closes. Contact 50 may be used to sound an appropriate audible alarm, such as a bell or buzzer, to signal an attendant that the corresponding tape cassette should be replaced or the tape recorder serviced. It is preferred that multiple tape recorders and CIU's be employed to provide tape redundancy. It is convenient to provide only a single audible alarm to be used by all of the CIU's in the system, in which case LED DS2 provides a convenient means for identifying which of the tape recorders requires the attendant's attention.

When the coil of relay K2 is energized, relay contact 52 also closes, thereby latching relay K2 in the energized state. With contact 52 closed, base current to transistor Q4 is provided through resistor R21, thereby causing transistor Q4 to remain on regardless of the state of pin 7 of U2. In order to de-energize relay K2 and thus turn off alarm 38, the attendant must press reset switch SW1, thereby grounding the base of transistor Q4 through diode CR6. Depression of switch SW1 also supplies base current to transistor Q3 through resistor R14 and diode CR4, thereby switching on transistor Q2 and energizing relay K1. This actuates the tape transport mechanism of the tape recorder for as long as switch SW1 is depressed so that the attendant can verify proper operation of the tape recorder. Depression of switch SW1 also grounds the base of transistor Q1 through diode CR5. This inhibits the application of a line current detectable by the IVEC so that it will not attempt to begin taping a message until the reset button is released.

When a message is completed, the IVEC opens the circuit between lines 32 and 34, thereby switching off transistors Q3 and Q2. Relay K1 is thus de-energized and the tape recorder stops. In order to prevent an alarm from sounding when recording of a message is completed in normal fashion, diode CR9 grounds the base of transistor Q4 when transistors Q3 and Q2 are switched off. It should be noted, however, that this will not affect a previously latched alarm.

Due to mechanical inertia, some initial period of time is required for spindle 46 to begin rotating after the IVEC signals a request for taping. In order to prevent a premature alarm as the tape recorder comes up to speed, the second section of multivibrator U2 provides a time delay determined by the values of resistor R17 and capacitor C4. This section of U2 is triggered by pin 12 which goes to a logic one state when transistor Q2 switches on. At all other times, pin 12 of U2 is held at ground through diode CR8. The inverted output at pin 9 of U2 remains at a logic zero (i.e. ground) for approximately three seconds after transistor Q2 switches on, thereby grounding the base of transistor Q4 through diode CR10.

Figure 3:
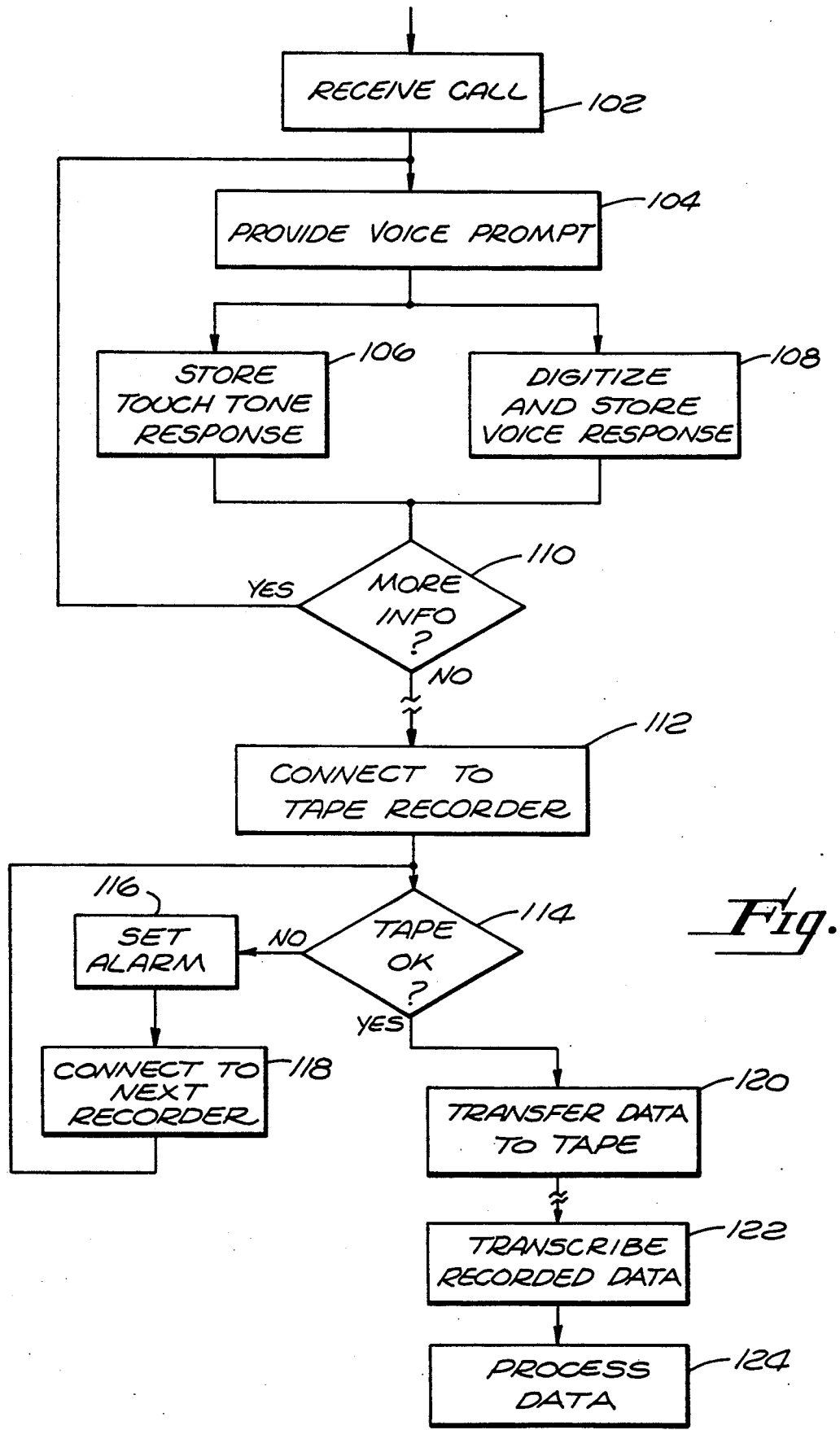
FIG. 3 is a functional flow diagram of a system for receiving and processing messages according to the present invention.

Referring now to FIG. 3, a method for automated receiving and processing of order information will be described. It is to be understood that an order entry system as described herein is but on exemplary application of the present invention and should not be construed as limiting the scope thereof. The present invention may be employed with a message exchange system whenever it is required or desired to automatically create verbal records of recorded voice and/or touch tone coded data in a convenient, standard audio recording medium for subsequent transaction processing off-line from such message exchange system. The invention is particularly useful for situations when a caller provides some information using the touch tone keys of a standard telephone instrument and provides other information in spoken form. For example, in the exemplary application of an order entry system, the caller would likely provide a catalog number, quantity and credit card information by touch tone codes. However, it is inconvenient to input address information using a standard telephone keyboard. While the IVEC system can readily receive and digitally store such spoken information, such information is not stored in a machine-readable format and can only be interpreted by regenerating an audio signal from the digitized information. Thus, the message exchange system contains a hybrid record of the transaction—part in machine-readable format and part in digitized (but non-machine-readable) speech.

By reconstructing an audio signal from the digitized voice information and recording it on a tape cassette, an off-line operator can transcribe the information into text or a machine-readable format. Touch tone coded information, automatically converted to machine-readable digital data by the IVEC system at the time the call was received is converted to synthesized speech and also recorded on the tape cassette, thereby creating a complete human-understandable verbal record of the transaction. Alternatively, only the regenerated voice information may be recorded and transcribed, which can later be correlated with the machine-readable touch tone information stored by the IVEC at the time the call was received.

As is more thoroughly described in the aforementioned copending application, the IVEC automatically connects to an incoming call at step 102 and provides an appropriate voice prompt at step 104. Typically, a greeting message is provided when the call is first answered, followed by a request for an initial item of information. The first request may be in the form of a menu of options with the caller's response depending upon the purpose of the call. Generally, the voice prompt will specify whether the response is to be made in the form of a touch tone code or is to be spoken. If the response is a touch tone code, the response is digitally stored at step 106. Since the IVEC system recognizes standard touch tone codes, the information is immediately stored in a machine-readable format.

If the response is spoken, the IVEC system processes the audio signal to digitize it and store it as previously described. After each response, the IVEC system determines whether or not more information is required based on the particular application. If further information is required, an appropriate voice prompt is again provided and the response is processed as described above. If all items of information have been obtained, a closing message would typically be provided to the calling party and the telephone connection terminated.

At some convenient time, the IVEC system retrieves the digitized voice information and regenerates an audio signal therefrom. Touch tone coded information relating to the same transaction is also retrieved and converted to synthesized speech. As used herein, synthesized speech refers to reconstruction of an audio signal from stored digitized speech rather than speech synthesis from stored phonemes or the like. However, it is to be understood that the present invention may also be used in connection with speech synthesized in the latter manner.

Additional verbal information relating to particular data items may also be synthesized and recorded for the convenience of the transcriber. For example, the synthesized spoken digits of the caller's credit card number may be preceded by "Credit card number is . . . ". All information relating to the transaction is then recorded on a tape cassette as described above.

As has been previously described, the IVEC system first connects to a tape recorder at step 112. The CIU closes the circuit to the tape recorder remote control, thereby starting the tape transport mechanism. The IVEC looks for the increase in line current from the CIU that indicates proper operation of the tape recorder. If the the recorder is not functioning properly, the alarm is set by the CIU at step 116 and the IVEC proceeds to connect to another tape recorder at step 118. When a properly functioning tape recorder is located, digitized voice data is retrieved, regenerated into an audio signal and transferred to the microphone input of the tape recorder. Preferably, the IVEC is programmed to again check for the higher level of line current at the end of the message to insure that the recorder did not stop during the message.

At some convenient time, tape cassettes are retrieved from the tape recorders and are given to an operator to be transcribed into either text, such as may be typed onto forms, labels or the like, or into a machine-readable format. Since all data to be transcribed is contained on a tape cassette, transcription can be conveniently performed either on or off-site. For example, tape cassettes can be retrieved daily and sent to an off-site service bureau for transcription.

Since touch tone coded information provided by a caller is automatically stored in a machine-readable format by the IVEC system, it is not essential that such information be included on the tape cassette to be transcribed. Thus, it is possible to record on tape only the verbal responses of a caller, which responses may then be transcribed to a machine-readable format on a magnetic tape, floppy disk or other computer compatible medium. The transcribed data can then be loaded into a general purpose computer together with touch tone response data that was stored by the IVEC in a machine-readable format at the time a call was received. In this fashion, a complete record of each order may be assembled in the general purpose computer for transaction processing.

It will be appreciated that orders may be partially processed prior to assembly of a complete record. For example, ordered items that are specified by touch tone responses may be pulled from inventory and prepared for shipment even though a shipping address has not yet been transcribed from the tap cassette. Furthermore, if a credit card number is received in the form of touch tone codes, credit verification can be immediately performed in the manner described in the co-pending application.

Correlation of the touch tone coded information and the transcribed voice information in a general purpose computer is conveniently performed by including a common header with both sets of information. For example, the IVEC computer may assign an order number as a call is received. All touch tone coded information is then associated with this order number. Furthermore, when the digitized voice information is transferred to tape, the IVEC may first "speak" the order number so that such number will be transcribed along with the voice information. Correlation can also be accomplished using caller provided information, such as a credit card number. However, for security reasons, it is preferable that an anonymous identifying number be assigned by the IVEC computer.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

We claim:

1. An apparatus for automatically transcribing information provided by a telephone caller to an automated message exchange system, said apparatus comprising:
    (a) line connection means for connecting to an incoming telephone call;
    (b) first signal processing means coupled to said line connected means for receiving and digitally storing the voice information provided by the caller;
    (c) second signal processing means for retrieving said digitally stored voice information and generating a verbal representation thereof;
    (d) third signal processing means for receiving touch tone codes provided by the caller and digitally storing information conveyed by said touch tone codes;
    (e) fourth signal processing means for retrieving said digitally stored touch tone coded information and generating a verbal representation thereof;
    (f) an audio recording device having an audio input for receiving an audio signal to be recorded; and
    (g) control means coupled to said audio recording device for automatically placing said audio recording device in a recording mode and for applying said verbal representation of said digitally stored voice information and said verbal representation of said touch tone coded information to said audio input of said audio recording device.

2. The apparatus of claim 1 further comprising alarm means coupled to said control means for indicating a malfunction of said audio recording device.

3. The apparatus of claim 1 wherein said audio recording device is a tape recorder.

4. In a message exchange system coupled to at least one telephone line for receiving incoming calls on said at least one telephone line, for providing verbal prompts to a caller, and for receiving information from the caller over said at least one telephone line in response to at least some of said verbal prompts, a method of automatically recording said information comprising the steps of:
    (a) prompting the caller to provide spoken verbal information;
    (b) creating a digital representation of said spoken verbal information received from the caller;
    (c) temporarily storing said digital representation of said spoken verbal information in digital form;
    (d) prompting the caller to provide touch tone coded information;
    (e) temporarily storing digital data corresponding to touch tones entered by the caller;
    (f) providing at least one audio recording device coupled to said message exchange system;
    (g) automatically enabling said audio recording device at a time subsequent to receipt of said spoken verbal and touch tone coded information;
    (h) verifying proper operation of said audio recording device;
    (i) converting said digital representation of said spoken verbal information to a first verbalized audio signal;
    (j) converting said digital data corresponding to touch tones entered by the caller to a second verbalized audio signal; and
    (k) recording said first and second verbalized audio signals on said audio recording device.

5. The method of claim 4 further comprising the step of transcribing said recorded verbalized audio signal into a machine-readable format.

6. The method of claim 4 further comprising the step of setting an alarm if proper operation of said audio recording device is not verified.

7. The method of claim 4 wherein said audio recording device is a tape recorder.

8. The method of claim 7 wherein said verification of proper operation of said tape recorder comprises verifying that a spindle of said tape recorder is rotating.

* * * * *